May 28, 1940.  F. W. CADDY  2,202,754
PISTON
Filed Oct. 3, 1938
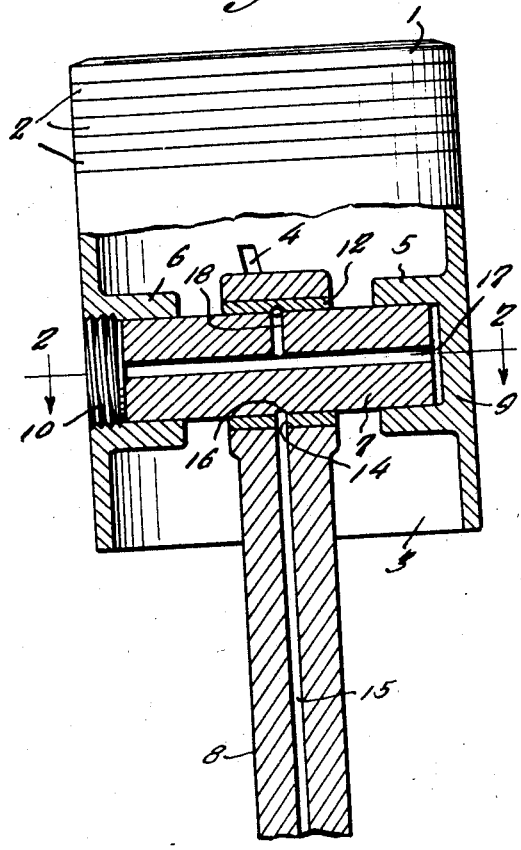
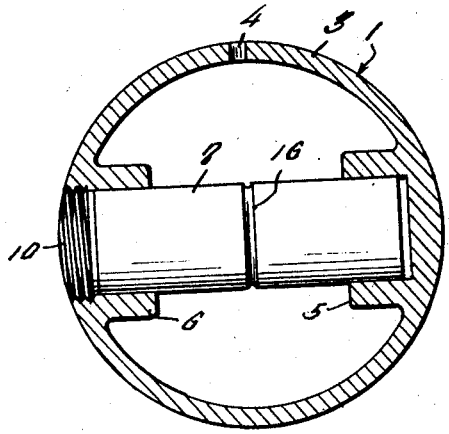
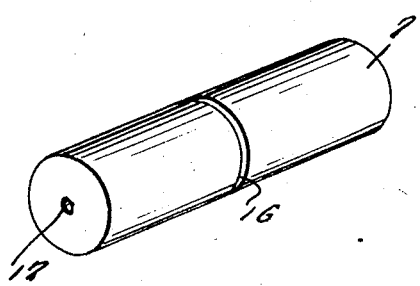
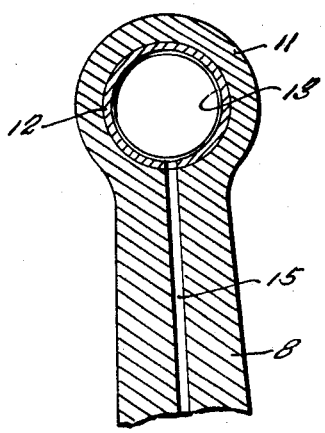
Inventor
F. W. Caddy
By Clarence A. O'Brien
and Hyman Berman
Attorneys Patented May 28, 1940

2,202,754

UNITED STATES PATENT OFFICE 2,202,754

PISTON

Fred W. Caddy, Hibbing, Minn., assignor of twenty-five and one-half per cent to William R. Spensley and twenty-five and one-half per cent to Andrew G. Anderson, both of Hibbing, Minn.

Application October 3, 1938, Serial No. 233,120

1 Claim. (Cl. 309—19)

The present invention relates to new and useful improvements in pistons particularly for internal combustion engines and has for its primary object to provide, in a manner as hereinafter set forth, a device of this character embodying a novel construction and arrangement whereby hydraulic pressure is utilized to expand the skirt of the piston in a manner to compensate for wear as it occurs, thus preventing "slap," prolonging the life of the piston and maintaining high efficiency in the engine in general.

Other objects of the invention are to provide a hydraulically expanded piston of the aforementioned character which will be comparatively simple in construction, strong, durable, light in weight and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:

Figure 1 is a view principally in vertical section through an embodiment of the invention.

Figure 2 is a view in horizontal section, taken substantially on the line 2—2 of Fig. 1 with the connecting rod omitted.

Figure 3 is a detail view in perspective of the wrist pin.

Figure 4 is a vertical sectional view through the upper portion of the connecting rod.

Referring now to the drawing in detail, it will be seen that the reference numeral 1 designates a piston having the usual rings 2 mounted in the upper portion thereof. The skirt 3 of the piston 1 is split, as at 4, to permit expansion.

On diametrically opposite sides the skirt 3 of the piston 1 has formed integrally therein aligned bearings 5 and 6. Journalled in the bearings 5 and 6 is a wrist pin 7 which is mounted on a connecting rod 8. The bearing 5 is closed at its outer end by the wall of the piston 1, as at 9. The bearing 6 is open at both ends and the outer end portion thereof is internally threaded to receive a removable closure plug 10.

Mounted in the eye 11 of the connecting rod 8 is a bushing 12 which receives the wrist pin 7 and which has formed in its inner periphery, at an intermediate point, a groove 13. The bushing 12 is further provided with an opening 14 which establishes communication between the groove 13 and an oil passage 15 in the connecting rod 8.

The wrist pin 7 has formed therein, at an intermediate point, a circumferentially extending groove 16 which is in registry with the groove 13 in the bushing 12. Extending longitudinally through the wrist pin 7 is a fluid passage 17. An opening or port 18 in the wrist pin 7 establishes communication between the groove 16 and the passage 17.

It is thought that the manner in which the invention functions will be readily apparent from a consideration of the foregoing. The passage 15 in the connecting rod 8 receives oil under pressure from the usual oil pump of the engine. This oil passes through the opening 14 into the grooves 13 and 16 and enters the passage 17 through the port 18. The oil under pressure then flows outwardly to the ends of the wrist pin 7 and enters the bearings 5 and 6. The bearings 5 and 6, being closed, the oil cannot escape with the result that the skirt 2 of the piston 1 is caused to expand. Although the piston 1 is free to rock on the connecting rod 8 in the usual manner, construction and arrangement is such that the passage 17 in the wrist pin 7 is in communication with the passage 15 in the connecting rod 8 at all times. The closure plug 10 permits the insertion of the wrist pin 7 in the bearings 5 and 6 and, of course, retains said wrist pin therein.

It is believed that the many advantages of a piston constructed in accordance with the present invention will be readily understood and although a preferred embodiment of the device is as illustrated and described, it is to be understood that changes in the details of construction may be resorted to which will fall within the scope of the invention as claimed.

What is claimed is:

A piston comprising a split skirt, aligned bearings in said skirt, an integral closure at the outer end of one of the bearings, a removable closure plug threadedly mounted in the outer end portion of the other of said bearings, a connecting rod having an oil passage therein, said connecting rod comprising an eye on one end, a bushing mounted in said eye, said bushing having an annular groove in its inner periphery and further having an opening therein establishing communication between the groove and the passage in the connecting rod, and a wrist pin mounted in the bushing and having its end portions journalled in the bearings, said wrist pin having a circumferentially extending groove at an intermediate point communicating with the groove in the bushing, said wrist pin further having a longitudinal oil passage extending therethrough from end to end thereof and communicating with the bearings, said piston still further having a radial port therein establishing communication between the groove and the passage in said wrist pin.

FRED W. CADDY.